(12) United States Patent
Degraeve

(10) Patent No.: US 7,509,379 B2
(45) Date of Patent: Mar. 24, 2009

(54) METHOD OF TRIGGERING A TRANSFER OF DATA STORED IN A DATABASE

(75) Inventor: Michel Degraeve, Rhode-Saint-Genese (BE)

(73) Assignee: Tiagala Holding S.A., Luxembourg (LU)

(*) Notice: Subject to any disclaimer, the term of this patent is extended or adjusted under 35 U.S.C. 154(b) by 613 days.

(21) Appl. No.: 11/287,679

(22) Filed: Nov. 28, 2005

(65) Prior Publication Data

US 2006/0079211 A1  Apr. 13, 2006

Related U.S. Application Data

(63) Continuation of application No. 09/815,507, filed on Mar. 23, 2001, now abandoned.

(30) Foreign Application Priority Data

| Mar. 24, 2000 | (EP) | ................................. 00870056 |
| Jul. 14, 2000 | (EP) | ................................. 00870163 |

(51) Int. Cl.
 *G06F 15/16* (2006.01)
(52) U.S. Cl. .................. 709/206; 709/202; 709/217; 709/228
(58) Field of Classification Search ................ 709/202, 709/206, 217–219, 227–229
See application file for complete search history.

(56) References Cited

U.S. PATENT DOCUMENTS

| 5,987,508 | A | 11/1999 | Agraharam et al. |
| 6,065,120 | A | 5/2000 | Laursen et al. |
| 6,097,793 | A | 8/2000 | Jandel |
| 6,141,413 | A | 10/2000 | Waldner et al. |
| 6,240,445 | B1 | 5/2001 | Kumar et al. |
| 6,246,871 | B1 | 6/2001 | Ala-Laurila |
| 6,256,666 | B1 | 7/2001 | Singhal |
| 6,393,421 | B1 | 5/2002 | Paglin |

(Continued)

FOREIGN PATENT DOCUMENTS

| EP | 1172976 | 1/2002 |
| GB | 2 384 940 | 8/2003 |
| GB | 2 388 280 | 11/2003 |
| TW | 536894 | 6/2003 |
| WO | WO 99/65256 | 12/1999 |

(Continued)

OTHER PUBLICATIONS

U.S. Appl. No. 60/159,083, filed Oct. 1999, Waites.

*Primary Examiner*—David Lazaro
(74) *Attorney, Agent, or Firm*—Knobbe Martens Olson & Bear LLP

(57) ABSTRACT

A method of sending data stored in a database from a sender to a recipient, which are mobile phone users, in relationship with a manager that defines a managing software application, wherein database and the manager are in connection with a website, involves entering into a connection between the sender and the manager. The sender enters into the connection with the manager and provides sender identification to the manager. Further, the method involves transferring an identifier to the manager, wherein the sender transfers the identifier that comprises at least a recipient's mobile phone number. Further, the method involves associating an e-mail address or a URL address with the identifier by the manager.

27 Claims, 3 Drawing Sheets

U.S. PATENT DOCUMENTS

| | | |
|---|---|---|
| 6,493,430 B2 | 12/2002 | Leuca et al. |
| 6,516,203 B1 | 2/2003 | Enzmann et al. |
| 6,529,956 B1 | 3/2003 | Smith et al. |
| 6,603,840 B2 | 8/2003 | Fellingham et al. |
| 6,671,714 B1 | 12/2003 | Weyer et al. |
| 6,742,022 B1 | 5/2004 | King et al. |
| 6,788,769 B1 | 9/2004 | Waites |
| 2003/0208522 A1 | 11/2003 | McDonnell et al. |
| 2004/0001226 A1 | 1/2004 | Ohtuka |
| 2004/0015989 A1 | 1/2004 | Hanaya et al. |

FOREIGN PATENT DOCUMENTS

| | | |
|---|---|---|
| WO | WO 99/66746 | 12/1999 |
| WO | WO 02/05582 | 1/2002 |
| WO | WO 02/073934 | 9/2002 |
| WO | WO 03/077160 | 9/2003 |

METHOD OF TRIGGERING A TRANSFER OF DATA STORED IN A DATABASE

PRIORITY

This application is a continuation of U.S. application Ser. No. 09/815,507, filed Mar. 23, 2001, now abandoned entitled METHOD OF TRIGGERING A TRANSFER OF DATA STORED IN A DATABASE, which claims priority to European Patent Application No. (EPO) 00 870 056.9 filed Mar. 24, 2000 and European Application No. (EPO) 00 870 163.3 filed Jul. 14, 2000.

BACKGROUND OF THE INVENTION

1. Field of the Invention

The present invention is related to telecommunications and company-wide communication. More particularly, the present invention is related to a new method of transferring data by using a mobile telephone. Actually the present invention is related to a method of sending data from a sender to a recipient and to a method of retrieving data, belonging to an owner by a recipient, the data being any kind of digital information stored on a database.

2. Description of the Related Art

Nowadays the convergence between mobile telephone systems and Internet is a growing trend.

The so called 'Web based communication centers' are websites offering a series of services that can be accessed by the Web and/or by the mobile phone: for example e-mail, storage and sharing of data, links towards other sites, synchronization between the information contained in the site and those on the hard disk. These websites manage on the Net both the information necessary for the owner's activities, and the data to be shared with others. This kind of cohabitation makes the consultation of information difficult since it requires the creation of user groups and various levels of securitized access. The wireless access capabilities are restricted to web-enabled (WAP) phones, which allow the checking of the e-mail account, and the sending of e-mails. Normal mobile phones cannot be used in such a scheme. The sending of e-mail from the mobile requires the awkward operation of entering an e-mail address on the WAP-phone.

Another type of existing application is a 'Mailbox manager'. This is a service wherein an electronic mailbox is provided to the customer, said mailbox being shared between the customer's PC and mobile phone. An e-mail account is created which can be accessed from any mobile phone. SMS messages (Short Message Service) can be sent between mobile phones.

A general drawback of the existing services is the fact that normal mobile phones cannot be used to send large data. Such transfer is limited to short messages.

Document WO-A-9966746 is related to a method and a wireless telecommunications system allowing the sending of multimedia messages through one service center from a sender to a recipient. The document is specifically related to wireless data transmission of several types of data, such as text, speech, images, video or combinations thereof. This method is however reserved for third generation mobile communication systems, such as UMTS and IMT-2000, which support the transmission of video images for example. Normal networks supporting only the sending of speech and short messages are not compatible with this method.

Document WO-A-9965256 describes a system for delivering electronic messages to digital mobile phones, comprising subsystems for retrieving electronic messages from an e-mail server and for summarizing said messages into a form suitable for presentation on a mobile phone. The system does not allow the sending of files, irrespective of their type and size.

The present invention aims to use the convergence between mobile telephone systems and the Internet to transfer data, with the use of any kind of mobile phone.

SUMMARY OF THE INVENTION

The present invention is related to a method of sending data which are stored in a database from a sender to a recipient, both of which are mobile phone users, in relationship with a managing software application, called 'manager', said database and said manager being in connection with a website, characterized in that said method comprises the following steps:

the sender enters into connection with the manager and identifies himself to the manager, the sender transfers an identifier to said manager, said identifier comprising at least the recipient's mobile phone number, the manager associates an e-mail address or a URL address with said identifier.

According to a preferred embodiment, said identifier comprises furthermore a code related to a selection in the database of the data to be transmitted, said manager associating said data to be transmitted to said e-mail address or URL address.

According to one embodiment of the method of sending data according to the present invention, said manager associates the recipient's e-mail address with said identifier, and said method comprises the step of the manager sending an e-mail to said recipient, said data being attached to said e-mail, said step being applied in case the recipient's e-mail address is known by the manager, i.e. is listed in a central database.

According to another embodiment of the method of sending data according to the present invention, said manager associates a URL address with said identifier, and said method comprises the step of the manager sending an SMS message comprising said URL address to the recipient's mobile phone, said URL address offering access to a web page comprising said selected data, said URL address being parameterized with the recipient's mobile phone number, said step being applied in case the recipient's e-mail address is not known by the manager.

According to one embodiment of the method of sending data according to the present invention, said URL is securitized by a login password which is communicated to the recipient by way of said SMS message.

According to one embodiment of the method of sending data according to the present invention, the sender uses a WAP mobile phone.

The present invention is equally related to a method of retrieving electronic data belonging to the owner of said data, by a recipient who is a mobile phone user, said data being stored in a database, in relationship with a managing software application, called 'manager', said database and said manager being in connection with a website, towards a recipient, characterized in that said method comprises the following steps:

the recipient enters into connection with the manager by sending an identifier to said manager, said identifier allowing said manager to identify said owner, the manager identifies the recipient through his mobile phone number, the manager associates an e-mail address and a URL address with the recipient's mobile phone number, the recipient receives said data.

According to one embodiment of the invention, said recipient may add a code to said identifier, said code being related to a selection of the electronic data to be transmitted, said manager associating said data to be transmitted to said e-mail address or URL address.

According to one embodiment of the method of retrieving data according to the present invention, said manager, after identifying said recipient, immediately sends a SMS or a vocal message comprising a summary of the data of the owner to said recipient's mobile phone.

According to one embodiment of the method of retrieving data according to the present invention, the manager associates the recipient's e-mail address with the recipient's mobile phone number, and said method comprises the step of the manager sending an e-mail to said recipient, said data being attached to said e-mail, said step being applied in case the recipient's e-mail address is known to the manager, i.e. listed in a central database.

According to another embodiment of the method of retrieving data according to the present invention, the manager associates a URL address with the recipient's mobile phone number, and said method comprises the step of the manager sending an SMS message comprising said URL address to the recipient's mobile phone, said URL address offering access to a web page comprising said data, said URL address being parameterized with the recipient's mobile phone number, said step being applied in case the recipient's e-mail address is not known to the manager.

According to one embodiment of the method of retrieving data according to the present invention, said URL is securitized by a login password which is communicated to the recipient by way of the SMS message comprising said URL.

According to one embodiment of the method of retrieving data according to the present invention, the recipient uses a WAP mobile phone. In that case, the recipient may gain direct access to the data owner's WAP site.

DETAILED DESCRIPTION OF THE PREFERRED EMBODIMENT

Figure 1:
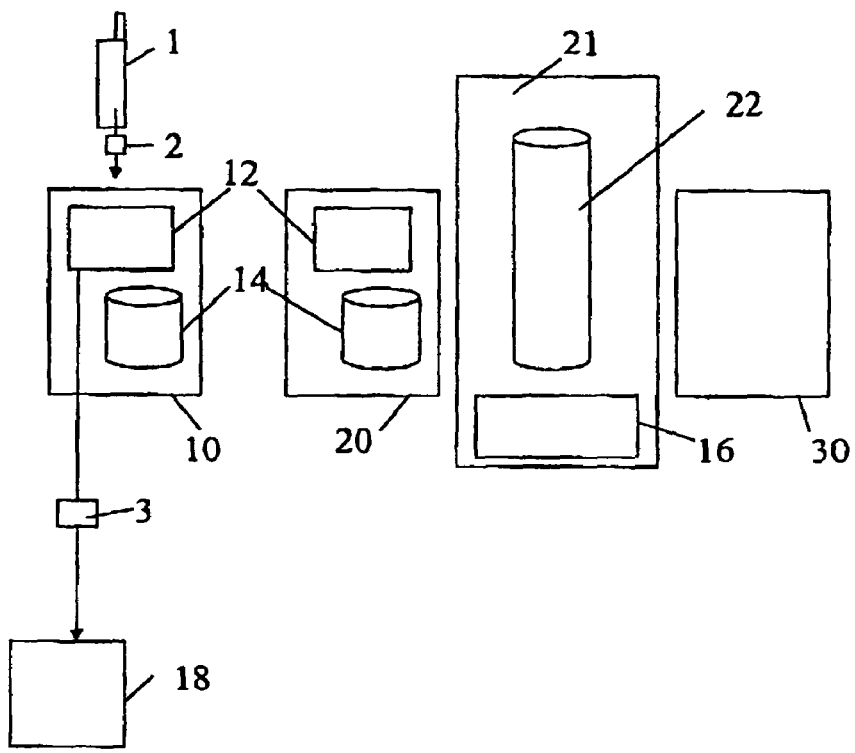
FIG. 1 illustrates the method of sending data (files) according to the invention in case the sender of data (files) and the recipient are both subscribers to a service offering the method of the invention and both are affiliated to the same mobile operator.

The method of the present invention preferably exists in the form of a service, which is offered to the public via the Internet. According to a preferred embodiment of the method of the invention, persons subscribing to said service are allowed the possibility to register a number of data in a database, in connection with the web/portal site of their mobile operator. Any type of electronic file may be sent with the method of the invention: wordprocessor data, spreadsheets, images, sound, etc . . . According to another embodiment, the service may be offered by anyone, not just by a mobile phone operator. In this case, the database will be associated to a web site, not necessarily the sender's portal web site. In the following, the preferred embodiment is described wherein the service is provided by mobile phone operators.

Subscribing to the service, they can choose one or both of two variants of the method of the invention, which will after this be called 'sending of data' and 'retrieval of data'.

sending: This allows the subscriber to use his mobile phone or any other mobile phone or a fixed phone in order to send data to any user of a mobile phone. By phoning the service, the subscriber can send a selection of these data to the recipient.

retrieval: this allows anyone to access—by way of his mobile phone—a predefined amount of information owned by the subscriber.

The method is devised in such a way that the person receiving the information does not have to be a subscriber to the service, nor must his or her mobile operator provide the service. The method makes sure that any mobile phone user can receive the selected information.

Both variants will be explained in more detail in the following. FIGS. 1 to 5 describe different modes of operation of the method of sending of data. The 'service' as such is shown in all these diagrams as a central block 21, comprising a central database 22 and an independent website 16. The database 22 stores the e-mail addresses and mobile phone numbers of all subscribers, independently of their mobile operator.

Blocks 10, 20 and 30 represent web/portal sites of three mobile operators. The first and second (10, 20) provide the service that allows the use of the method of the invention. The last portal 30 doesn't. This distinction is indicated by the presence of a managing application 12 and database 14 in connection with the first two portals.

The heart of the invention lies in the managing application, or 'manager' 12, which is a software application allowing the encoding, management and distribution of the data. The database 14 contains all information pertinent to all subscribers affiliated to that particular mobile operator: mobile phone number, e-mail address, and the data they want to send.

Sending of Data

1. Subscribing

A person who wishes to subscribe to this variant of the method will log on to the web/portal site of his mobile operator. If he wants to be able to use the service to send data (files), his mobile operator must provide the service, in other words, his mobile operator's portal must contain a manager 12 and database 14. If this is the case, he can select a GUI (Graphical User Interface) on his operator's web/portal site. In the GUI, the subscriber is asked to enter his e-mail address and mobile phone number. He will have the opportunity to store a number of data onto the database 14. If he owns a normal mobile phone, he is allowed a maximum of ten data. If he owns a WAP phone, he may choose a virtually limitless number of data.

2. Sending Data

In all diagrams 1 to 5, the sender starts by calling the service at a number which is common to all subscribers to the service who are affiliated to the same mobile operator. The sender is identified by the manager 12 of his operator, simply by his own mobile phone number. If he calls from another mobile phone or from a fixed phone, he is asked to enter a security code. The sender then transmits an identifier 2 which is routed to the manager 12 of his own mobile operator's portal 10. The identifier 2 comprises the recipient's phone number and possibly a code relating to a selection of the data the sender wishes to transmit.

The manager 12 will then check whether or not the recipient is registered in the central database 22. Depending on this, different modes of operation are possible.

Case 1: The Recipient is Registered in the Database 22 and Has the Same Mobile Operator as the Sender: FIG. 1

This means that the recipient's e-mail address is also stored in the local database 14. In this case, the manager 12 recognizes the recipient, finds his or her e-mail address in the database 14 and sends an e-mail 3 with the selected data attached to the recipient's PC 18.

Figure 2:
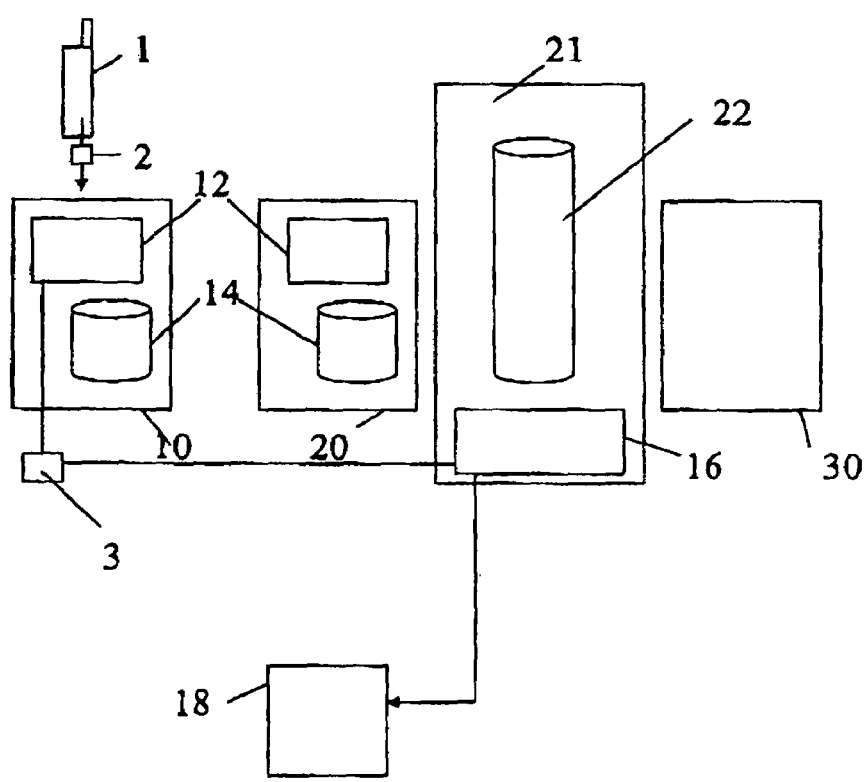
FIG. 2 illustrates the method of sending data (files) according to the invention in case the sender of data (files) and the recipient are both subscribers to a service offering the method of the invention and both are affiliated to different mobile operators.

Case 2: The Recipient is Registered in the Database 22 and Has a Different Mobile Operator than the Sender: FIG. 2

After failing to find the recipient in the database 14, the manager consults the central database 22, which lists all subscribers affiliated to the service of each operator. In the case of FIG. 2, the recipient has the mobile operator with portal 20. The web site 16 then routes the e-mail 3 with the selected data attached towards the recipient's PC 18.

Figure 3:
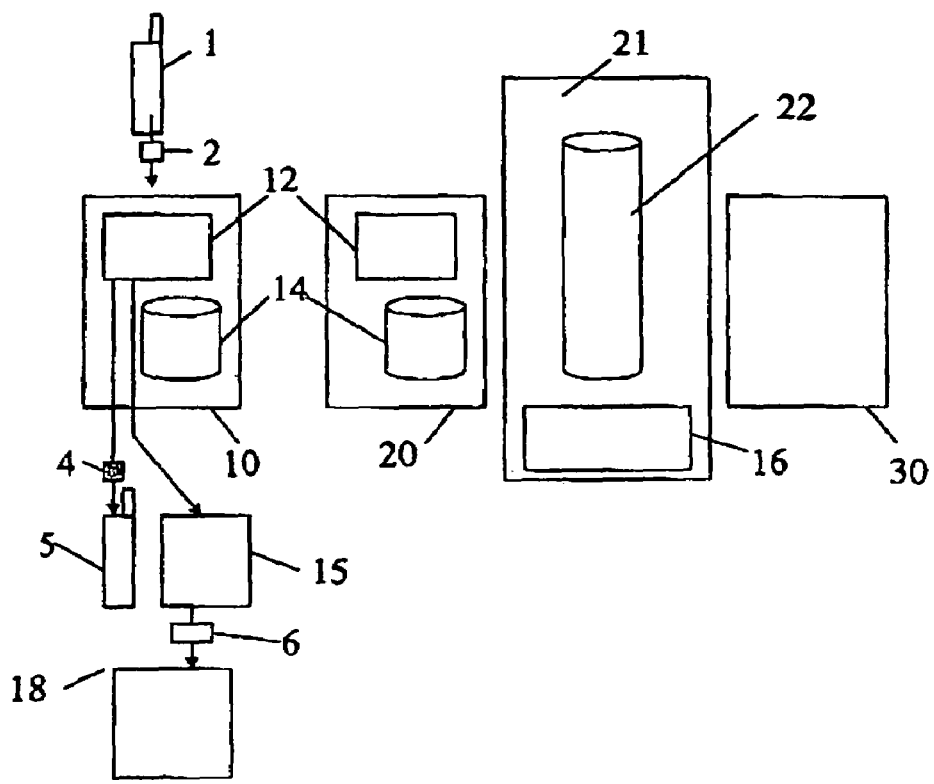
FIG. 3 illustrates the method of sending data (files) according to the invention in case the recipient is not a subscriber to a service offering the method of the invention, but is affiliated to the sender's mobile operator.

Case 3: The Recipient is not Registered in the Database 22 and Has the Same Mobile Operator than the Sender: FIG. 3

The manager now fails to find the recipient's e-mail address in the central database 22. Therefore, the manager 12 places the contents of the selected data on a Web page 15 and assigns a URL (Uniform Resource Locator or Web address page) to it, said URL being parameterized with the mobile telephone number of the recipient, meaning that the recipient's mobile phone number is comprised in said URL. Since both sender and recipient have the same mobile operator, the second level domain name of the URL is defined by the operator.

To inform the recipient of this URL, the manager sends an SMS message 4 to the recipient's mobile phone 5, mentioning the sender's name and the URL address and possibly a login password, allowing the recipient to download the selected data 6 to his PC 18. The fact that the URL comprises the recipient's telephone number is a mnemonic aid for the recipient, facilitating his access to the selected data on the Internet.

Figure 4:
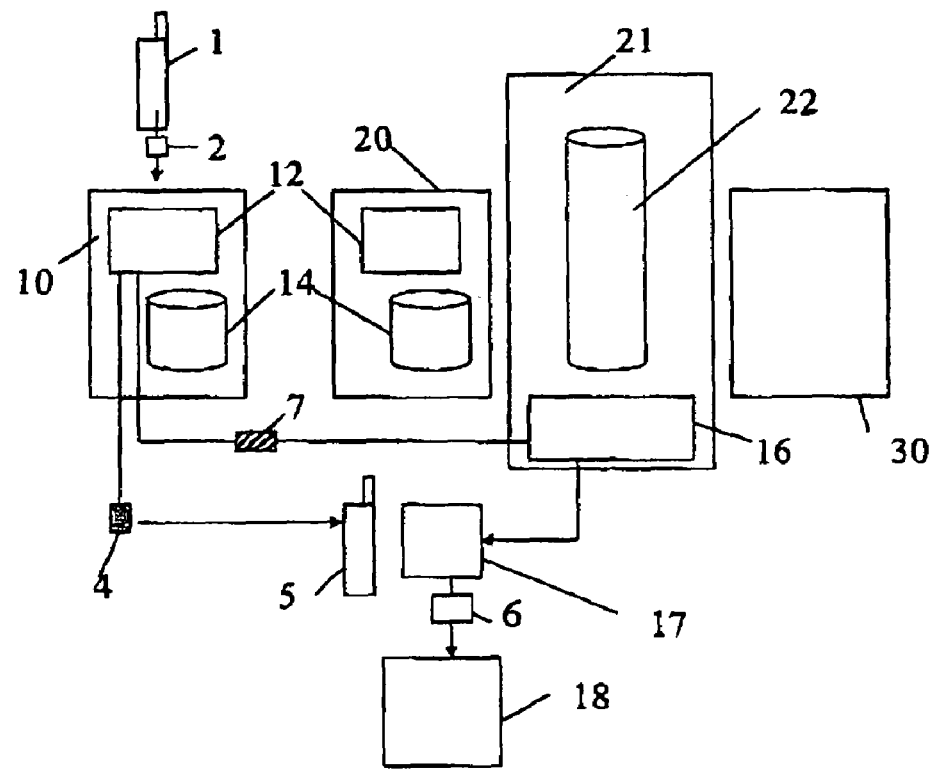
FIG. 4 illustrates the method of sending data (files) according to the invention in case the recipient is not a subscriber to a service offering the method of the invention, but is affiliated to a different mobile operator than the sender's, said mobile operator providing the service.

Case 4: The Recipient is not Registered in the Database 22 and Has a Different Mobile Operator than the Sender, but his Mobile Operator does Provide the Service: FIG. 4

Again, the recipient's e-mail address is not found in the databases 14 and 22. The recipient's web/portal site 20 does however provide the service. The independent web site 16 now routes the links 7 of the selected data to a web page 17, with a URL parameterized with the recipient's mobile phone number. Said URL's second level domain name is defined by the recipient's operator 20. An SMS message 4 is once again sent to the recipient's mobile phone 5, informing him of the URL of web page 17, containing said links, so that he is capable of downloading the selected data 6 to his PC 18.

Figure 5:
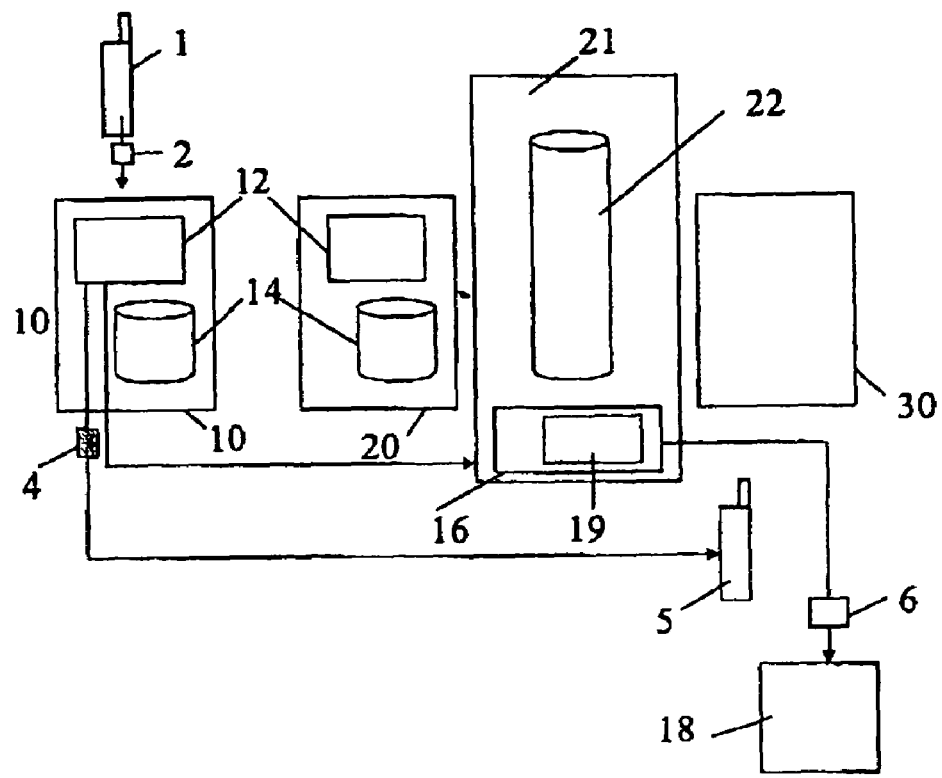
FIG. 5 illustrates the method of sending data (files) according to the invention in case the recipient is not a subscriber to a service offering the method of the invention, but is affiliated to a different mobile operator than the sender's, said mobile operator not providing the service.

Case 5: The Recipient is not Registered in Database 22 and Has a Different Mobile Operator than the Sender, which does not Provide the Service: FIG. 5

The independent web site 16 now creates the URL 19, which is parameterized with the recipient's mobile phone number, in the name of the independent site itself. The manager sends an SMS 4, containing said URL, so that the recipient may retrieve the selected data 6 to his PC 18.

If no code was added to the recipient's phone number in the identifier 2, a predefined e-mail is sent to the recipient without attachments, for example comprising the sender's personal info (case 1 or 2). If the recipient's e-mail address is not listed in the central database 22 (cases 3, 4, 5), the contents of the predefined e-mail are included on the web page (15, 17 or 19).

3. Example of Data Transmitted

As an example, a procedure is provided hereafter which might be used for sending data in case 3 described above, in which the recipient is not a subscriber to the service, but has a mobile operator who provides the service. The method pertains to the use by the sender of an ordinary mobile phone. Only the encoding sequence is pertinent, the encoding dialog will be determined by the technology being used (Interactive vocal responder, SIM tool kit, WAP server, . . . ):

The sender calls the service (if possible via a Short Code).

His call allows him to be identified by way of his mobile telephone number; if that is not the case, the voice server or a message asks him to insert his security code followed by two squares.

He enters the identifier 2: +32476233805*23##. The first part of this identifier is the recipient's mobile phone number. Then the sender enters a code relating to a selection of the data to be transmitted: he taps the '*' key, followed by numbers 2 and 3, indicating that he wishes the recipient to receive data n°2 and n°3. The list of 10 data is encoded by numbers 0 to 9.

The manager 12, upon not recognizing the recipient, sends an SMS 4 to the recipient's mobile telephone indicating the sender's name, the recipient's URL and possibly his login password. In the case of the exemplary recipient with number +32476233805, the URL would be: www.mobileoperator.com/32476233805.

The recipient may download the data, through his web browser, by entering the URL from any Internet terminal.

The web page to which the URL points may contain links from various senders.

The sender may wish to send the predefined e-mail to the recipient, without attached documents. In that case, he may tap in +32476233805##.

The sender may reach multiple recipients by tapping in the following identifier 2: +32476233805#+33608198216*123##.

Retrieval of Data

1. Subscribing

On the web/portal site of his mobile operator, the subscriber may select a second GUI offering him the chance to put a predefined amount of information (files) at the disposal of the public. By subscribing, he is provided with a mobile phone number, which may be used from any mobile phone in order to receive the information the subscriber has stored.

In the GUI, the subscriber may select the sending of an SMS or a vocal message to any one wishing to receive the information. This is further explained after this.

2. File Retrieval

Figure 6:
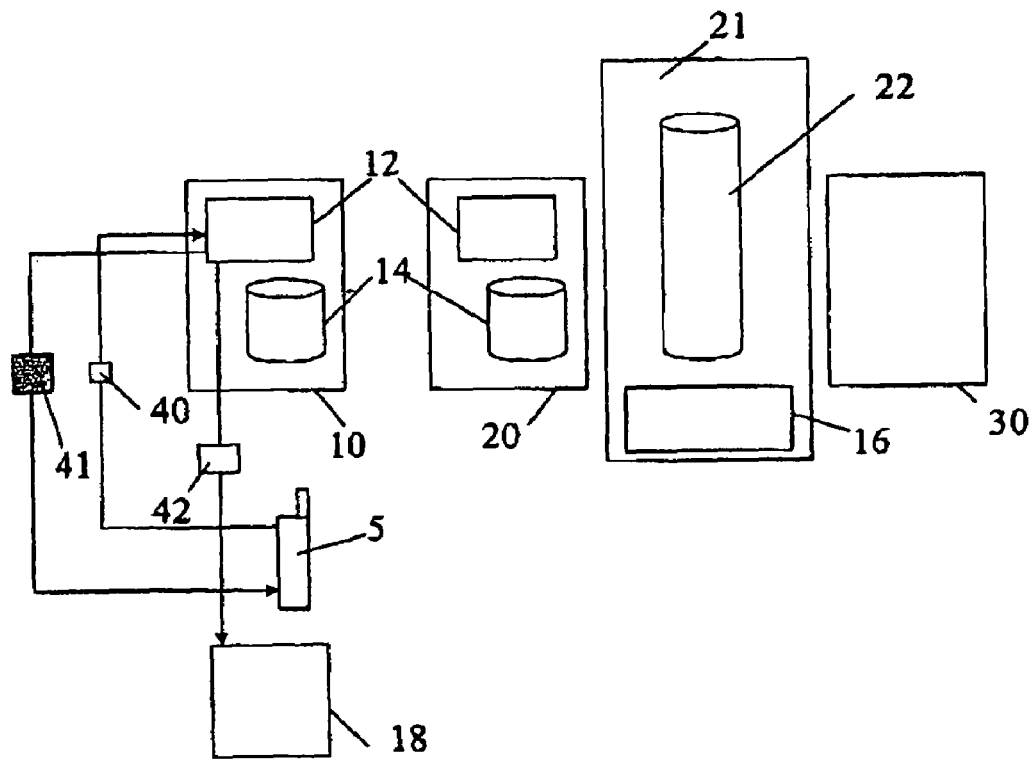
FIG. 6 illustrates the method of retrieving data (files) according to the invention.

This operation is triggered not by the owner of the information, but by the one wishing to receive it, i.e. the recipient. To be able to do this, the recipient calls the number attributed to the owner upon subscription (see point 1). For example, a recipient may be presented with this number next to a house for sale. Calling the number will provide him with the information (prices, description, etc . . . ) as it was selected by the owner. FIG. 6 shows the relevant diagram in case the recipient is registered in the database 22 and has the same operator as the information owner.

The recipient calls the telephone number 40 which was assigned to the owner upon subscription. This allows the manager 12 to identify the owner. The manager 12 identifies the recipient by way of his mobile telephone number. If he calls from his mobile phone, which is the preferred case, this identification is done by the call itself. According to a preferred embodiment of the invention, the manager 12 of the owner's mobile operator 10 then immediately responds by sending a message 41 to the recipient's mobile phone. This message 41 can be an SMS or a vocal message depending on what the subscriber has selected. In both cases, the message 41 provides the recipient with a summary of the information. The manager detects that the recipient is in fact listed in the database 14 and sends an e-mail 42 to the recipient's PC, with the information in attachment.

In all other cases (recipient registered and having another operator, etc . . . ) the SMS or vocal message is sent. After that, each case is handled in the same way as described in the variant 'sending of data'.

The subscriber may also provide the possibility for the recipient to select which data he wishes to receive. Preferably, this selection consists of a number of pages of a single web site, which contains the totality of the information the owner puts at the recipient's disposal. By entering a number of digits after the number, the recipient may then select the data. For example, if the number made public next to a house of sale is +32476253698 and the recipient wishes to receive page 23, he should call +32476253698*23. Of course, the owner must provide with the number to call, the contents and the number associated with each page.

Using the WAP (Wireless Application Protocol) the service based on the method according to the invention is further facilitated.

Some differences arise with the above explained variants of the method, if the subscriber or the recipient uses a WAP phone:

sending of data from a WAP phone:

The subscriber who wishes to transmit a selection of data now calls his mobile operator's WAP server. From a menu, he is able to select the file transmitting service, which will enable him to enter the recipient's mobile phone number. After this, the sending of the information takes place in the same way as described above.

file retrieval using a WAP phone:

The person wishing to receive information calls his mobile operator's WAP server, if his operator provides the service. If not, he follows the relevant procedure described above for a normal phone. If his operator provides the service, he can select that service from a menu and enter the telephone number assigned to the owner upon subscription. If the subscriber owns a WAP site, the recipient is allowed direct access to this site, giving him immediately a summary of the complete information. If not, the procedure with the summary SMS or vocal message is pursued. In any case, the recipient receives afterwards the complete information in one of the ways described above (e-mail or URL), depending on whether or not he is known to the manager.

As mentioned above, a service providing use of the method of the invention may equally be provided by anyone other than a mobile phone operator. In this case, the manager 12 and database 14 are associated with a website, owned by the provider of the service. The database would then contain all information relevant to subscribers affiliated to that particular provider, independently from their mobile operator. The communication with the manager (i.e. contacting the service, sending an SMS) would have to take place through one mobile operator, chosen by the provider, but this would not necessarily have to be the sender's or file owner's operator. For recipients who are not subscribers, a URL may then be created in the name of the provider's web site or in the name of the independent web site 16.

Whenever the recipient is not a subscriber to the service, and has to download the selected data from a web page (15, 17 or 19), he is provided on said page with an inscription form to allow him to enter his e-mail address, so as to simplify the transfer later on. This means that such a recipient may from that moment on receive data directly in his mailbox, in the manner shown in FIG. 1 or 2. However, as long as he does not subscribe, he cannot send data himself. Naturally, in order for the recipient to use the service himself, the recipient's mobile operator must provide it.

The web page on which the recipient is to retrieve the selected data can be securitized by recording a login password, which is communicated to the recipient via the SMS message 4.

The independent web site 16 lists all subscribers affiliated to each mobile operator providing the service. The information pertinent to the subscribers of each operator is of course compartmentalized within the central database 22 and remains the operator's property.

The manager access is restricted so that only the subscriber can create, modify or distribute his data, except notification thereof.

The method of the invention provides an improvement with respect to existing services, in that it allows the sending or retrieving of large electronic data being initiated from any type of mobile phone. No change of e-mail address is required or addition of another e-mail address. The method is easy to use. Management of security is simplified : only the owner of the information manages its distribution; only the recipient decides upon the access to his personalized URL.

A particular advantage of the method of retrieving data according to the invention resides in the fact that the owner of the data can identify the persons who have accessed his WAP site.

Various applications of the method of the invention are possible. As an example, the method can be used as an electronic way of transmitting business cards. The contents of the sender's business card are stored in one of the data in the database 14. By entering the code 2, the card owner can command the transmittal of his card to a recipient of his choice, whether or not this recipient or his mobile operator are subscribing to the service. In addition to his business card, the sender may add price lists, images, formation folders, etc.

What is claimed is:

1. A method of retrieving data being stored in a database, and belonging to an owner, by a recipient who is a mobile phone user, in relationship with a manager defining a managing software application, said database and said manager being in connection with a web site, towards a recipient, comprising:

entering into a connection between the recipient and the manager, the recipient being different than said owner, wherein the recipient enters into the connection with the manager by sending an identifier to said manager, wherein said identifier is a mobile phone number provided to said owner by the manager, wherein said identifier allows said manager to identify said owner, and wherein entering into the connection comprises using the identifier to initiate the connection;

identifying the recipient by the manager through the recipient's mobile phone number, wherein said manager creates and associates a URL address with the recipient's mobile phone number, said URL address offering access to a web page comprising said data, and said URL address being parameterized with the recipient's mobile phone number;

retrieving said data stored in said database to said address URL; and providing said URL address to the recipient.

2. The method of claim 1, wherein said recipient adds a code to said identifier, said code being related to a selection of the data to be transmitted, said manager associating said data with said URL address.

3. The method of claim 1, wherein said manager, after identifying said recipient, immediately sends a message comprising a summary of the data of the owner to said recipient's mobile phone.

4. The method of claim 3, wherein said message is an SMS message.

5. The method of claim 3, wherein said message is a vocal message.

6. The method of claim 1, wherein said manager associates a recipient's e-mail address with said mobile phone number, wherein the manager sends an e-mail to said recipient, said data being attached to said e-mail, in case the recipient's e-mail address is known to said manager and listed in a central database.

7. The method of claim 1, wherein the manager sends an SMS message comprising said URL address to the recipient's mobile phone.

8. The method of claim 7, wherein said URL is secured by a login password which is communicated to the recipient by way of said SMS message, comprising said URL.

9. The method of claim 1, wherein said recipient uses a WAP mobile phone.

10. The method of claim 9, wherein said recipient gains direct access to the data belonging to the owner or to a WAP site owned by said data owner.

11. A method of retrieving data being stored in a database, and belonging to an owner, by a recipient who is a mobile phone user, in relationship with a manager defining a managing software application associated with a retrieving data service, said database and said manager being in connection with a web site, towards a recipient, comprising:

entering into a connection between the recipient and the manager, the recipient being different than said owner, wherein the recipient enters into the connection with the manager by sending an identifier to said manager, wherein said identifier is a mobile phone number provided to said owner by the manager, wherein said identifier allows said manager to identify said owner and/or data, and wherein entering into the connection comprises using the identifier to initiate the connection;

identifying the recipient by the manager through the recipient's mobile phone number, wherein the recipient is registered with the retrieving data service, and wherein said manager associates an e-mail address with the recipient's mobile phone number based on corresponding e-mail information associated with the recipient being registered with the retrieving data services; and retrieving said data stored in said database and sending the retrieved data to the e-mail address.

12. The method of claim 11, wherein said recipient adds a code to said identifier, said code being related to a selection of the data to be transmitted, said manager associating said data to be transmitted with said e-mail address.

13. The method of claim 11, wherein said manager, after identifying said recipient, immediately sends a message comprising a summary of the data of the owner to said recipient's mobile phone.

14. The method of claim 13, wherein said message is an SMS message.

15. The method of claim 13, wherein said message is a vocal message.

16. The method of claim 11, wherein the manager sends an e-mail to said recipient.

17. The method of claim 11, wherein said recipient uses a WAP mobile phone.

18. The method of claim 17, wherein said recipient gains direct access to the data belonging to the owner or to a WAP site owned by said data owner.

19. A method of retrieving data, being stored in a database, by a recipient who is a mobile phone user, in relationship with a manager defining a managing software application associated with a retrieving data service, said database and said manager being in connection with a web site, towards a recipient, the method comprising:

entering into a connection between the recipient and the manager, the recipient being different than said owner, wherein the recipient enters into the connection with the manager by sending an identification to said manager, wherein said identification is a mobile phone number provided to said owner by the manager and entering into the connection comprises calling the identification, and wherein said identification allows said manager to at least identify a portion of the data stored in the database to be retrieved;

identifying the recipient by the manager through the recipient's mobile phone number, wherein said manager determines if the recipient is registered with the retrieving data service;

associating an e-mail address with the recipient's mobile phone number and sending at least some of said identified portion of data to said e-mail address if the recipient is registered with the retrieving data service; and associating URL address with the recipient's mobile phone number and providing the recipient with said URL address if the recipient is not registered with the retrieving data service, said URL address offering access to a web page comprising at least some of said data, and said URL address being parameterized with the recipient's mobile phone number.

20. The method of claim 19, wherein said manager, after identifying said recipient, immediately sends a message comprising a summary of the retrieved portion of the data to said recipient's mobile phone.

21. The method of claim 20, wherein said message is an SMS message.

22. The method of claim 20, wherein said message is a vocal message.

23. The method of claim 19, wherein the manager sends an e-mail to said recipient with the retrieved portion of the data.

24. The method of claim 19, wherein said recipient uses a WAP mobile phone.

25. The method of claim 24, wherein said recipient gains direct access to a WAP site associated with the identified portion of the data stored in the database.

26. The method of claim 19, wherein the manager sends an SMS message comprising said URL address to the recipient's mobile phone.

27. The method of claim 26, wherein said URL is secured by a login password which is communicated to the recipient by way of said SMS message, comprising said URL.

* * * * *

UNITED STATES PATENT AND TRADEMARK OFFICE
CERTIFICATE OF CORRECTION

PATENT NO. : 7,509,379 B2  Page 1 of 1
APPLICATION NO. : 11/287679
DATED : March 24, 2009
INVENTOR(S) : Michel DeGraeve It is certified that error appears in the above-identified patent and that said Letters Patent is hereby corrected as shown below:

| Column | Line | Description of Error |
|---|---|---|
| 8 | 59 (Approx.) | Change "formation" to --information--. |
| 9 | 17-18 | In Claim 1, change "address URL;" to --URL address;--. |
| 9 | 54 | In Claim 11, before "comprising" insert --the method--. |
| 10 | 52 | In Claim 19, before "URL" insert --a--. |

Signed and Sealed this

Twenty-fourth Day of November, 2009

David J. Kappos
*Director of the United States Patent and Trademark Office*